US012689426B2

(12) United States Patent
Pezeshki et al.

(10) Patent No.: US 12,689,426 B2
(45) Date of Patent: Jul. 21, 2026

(54) EFFICIENT SIGNALING OF BEAM SHAPE INFORMATION

(71) Applicant: QUALCOMM Incorporated, San Diego, CA (US)

(72) Inventors: Hamed Pezeshki, San Diego, CA (US); Arumugam Chendamarai Kannan, San Diego, CA (US); Sony Akkarakaran, Poway, CA (US); Qiaoyu Li, Beijing (CN); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 18/996,966

(22) PCT Filed: Aug. 20, 2022

(86) PCT No.: PCT/CN2022/113791
§ 371 (c)(1),
(2) Date: Jan. 17, 2025

(87) PCT Pub. No.: WO2024/040365
PCT Pub. Date: Feb. 29, 2024

(65) Prior Publication Data
US 2026/0039360 A1 Feb. 5, 2026

(51) Int. Cl.
*H04B 7/06* (2006.01)
(52) U.S. Cl.
CPC ....... *H04B 7/06952* (2023.05); *H04B 7/0626* (2013.01)

(58) Field of Classification Search
CPC . H04B 7/06952; H04B 7/0626; H04B 7/0695
See application file for complete search history.

(56) References Cited

U.S. PATENT DOCUMENTS 11,219,027 B2     1/2022   Raghavan
2017/0302341 A1*  10/2017  Yu .................... H04W 72/0446
(Continued)

FOREIGN PATENT DOCUMENTS

WO        2021138232 A1     7/2021

OTHER PUBLICATIONS

International Search Report and Written Opinion—PCT/CN2022/113791—ISA/CN—Feb. 22, 2023.

*Primary Examiner* — Sung S Ahn
(74) *Attorney, Agent, or Firm* — Procopio, Cory, Hargreaves & Savitch LLP

(57) ABSTRACT

A first wireless device may receive a set of indications for each beam zone of a plurality of beam zones. The set of indications, for each beam zone, may include (i) a first indication of a full beam shape of a first beam associated with the beam zone, (ii) a second indication of a first difference in beam shape amplitude for each beam of a set of second beams associated with the beam zone and (iii) a third indication of a second difference in beam shape phase for each beam of the set of second beams associated with the beam zone. The first wireless device may derive at least one of an angle of arrival (AoA) or an angle of departure (AoD) of a channel based on the set of indications for each beam zone of the plurality of beam zones.

30 Claims, 13 Drawing Sheets

400

(56) References Cited

U.S. PATENT DOCUMENTS

| | | | |
|---|---|---|---|
| 2018/0219605 A1 | 8/2018 | Davydov et al. | |
| 2018/0227898 A1* | 8/2018 | Noh ..................... | H04B 7/0695 |
| 2020/0304186 A1 | 9/2020 | Venugopal et al. | |
| 2022/0029685 A1 | 1/2022 | Li et al. | |
| 2022/0149908 A1 | 5/2022 | Gao et al. | |
| 2022/0224395 A1 | 7/2022 | Zhou et al. | |

* cited by examiner

AoD/ZoD may be quantized to one
of the adjacent four 2D grid points

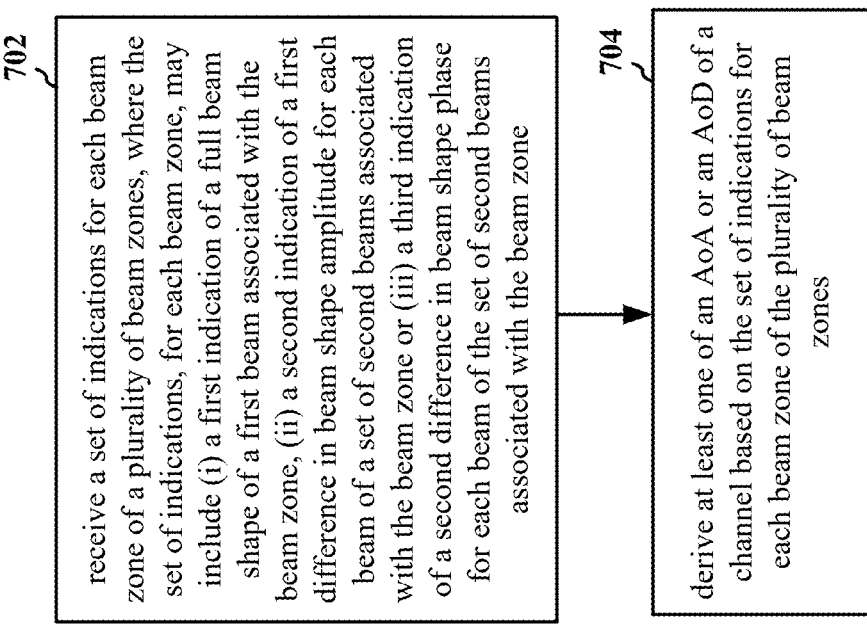

702 receive a set of indications for each beam zone of a plurality of beam zones, where the set of indications, for each beam zone, may include (i) a first indication of a full beam shape of a first beam associated with the beam zone, (ii) a second indication of a first difference in beam shape amplitude for each beam of a set of second beams associated with the beam zone or (iii) a third indication of a second difference in beam shape phase for each beam of the set of second beams associated with the beam zone

704 derive at least one of an AoA or an AoD of a channel based on the set of indications for each beam zone of the plurality of beam zones

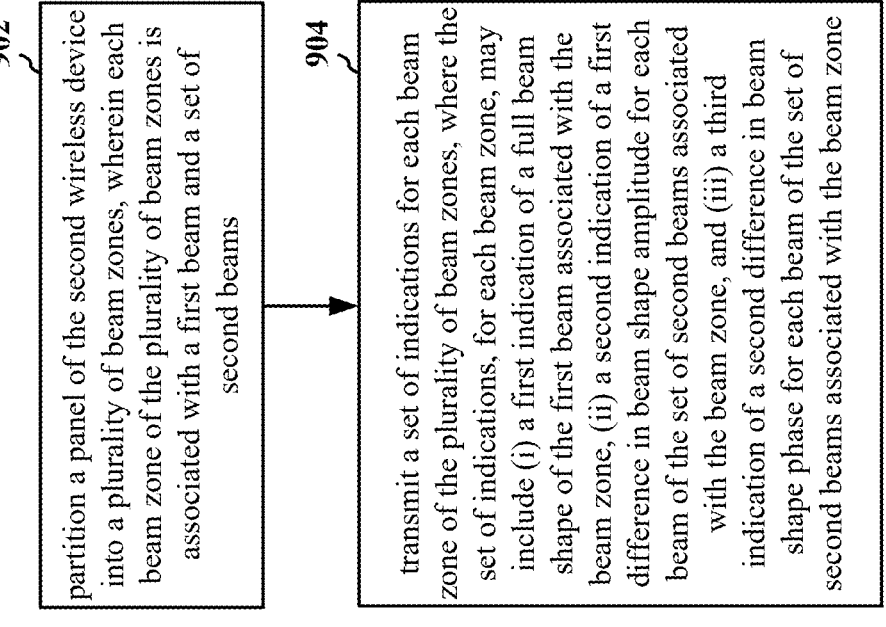

902 partition a panel of the second wireless device into a plurality of beam zones, wherein each beam zone of the plurality of beam zones is associated with a first beam and a set of second beams

904 transmit a set of indications for each beam zone of the plurality of beam zones, where the set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone

1002 partition a panel of a second wireless device into a plurality of beam zones, where each beam zone of the plurality of beam zones may be associated with a first beam and a set of second beams

1004 transmit a set of indications for each beam zone of the plurality of beam zones, where the set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone

1006 transmit an RRC configuration including the set of indications

1008 transmit the set of indications to a UE, where the second wireless device includes a network node

1010 transmit the set of indications to a network node, where the second wireless device includes a UE

1012 obtain at least one of a signal from a using a selected beam or an indication of the selected beam, where at least one of the signal or the indication may be obtained from a second wireless device based on the set of indications for each beam zone of the plurality of beam zones

FIG. 10

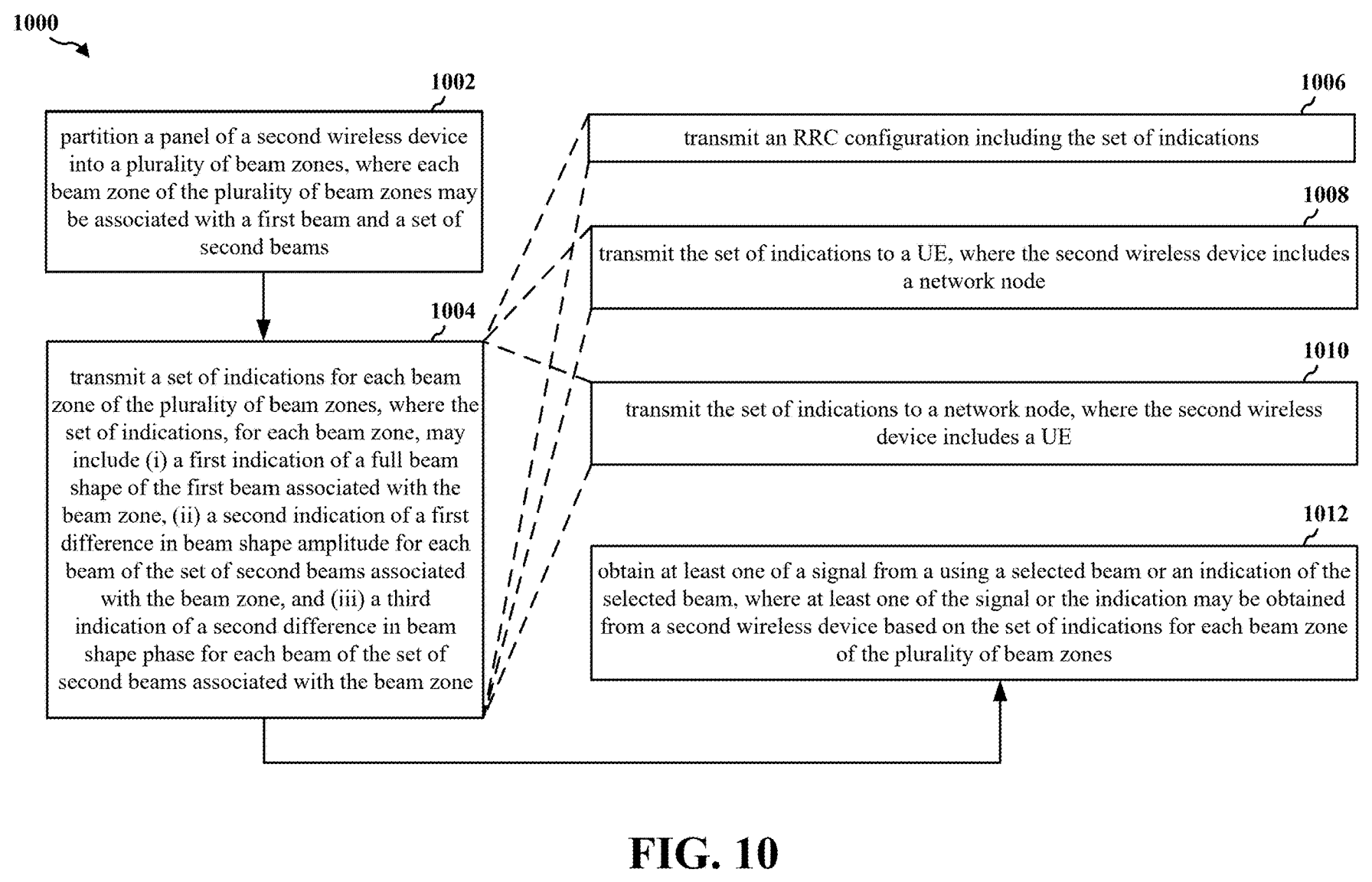

EFFICIENT SIGNALING OF BEAM SHAPE INFORMATION

CROSS REFERENCE TO RELATED APPLICATION(S)

This application is a National Stage Application filed under 35 U.S.C. § 371 of PCT International Application No. PCT/CN2022/113791, entitled "EFFICIENT SIGNALING OF BEAM SHAPE INFORMATION" and filed Aug. 20, 2022, which is expressly incorporated by reference herein in its entirety.

TECHNICAL FIELD

The present disclosure relates generally to communication systems, and more particularly, to a system that transmits wireless beam shapes.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first wireless device are provided. The apparatus may receive a set of indications for each beam zone of a plurality of beam zones. The set of indications, for each beam zone, may include at least one of (i) a first indication of a full beam shape of a first beam associated with the beam zone, (ii) a second indication of a first difference in beam shape amplitude for each beam of a set of second beams associated with the beam zone, or (iii) a third indication of a second difference in beam shape phase for each beam of the set of second beams associated with the beam zone. The apparatus may derive at least one of an angle of arrival (AoA) or an angle of departure (AoD) of a channel based on the set of indications for each beam zone of the plurality of beam zones.

In an aspect of the disclosure, a method, a computer-readable medium, and an apparatus at a second wireless device are provided. The apparatus may partition a panel of the second wireless device into a plurality of beam zones. Each beam zone of the plurality of beam zones may be associated with a first beam and a set of second beams. The apparatus may transmit a set of indications for each beam zone of the plurality of beam zones. The set of indications, for each beam zone, may include at least one of (i) a first indication of a full beam shape of the first beam associated with the beam zone, (ii) a second indication of a first difference in beam shape amplitude for each beam of the set of second beams associated with the beam zone, or (iii) a third indication of a second difference in beam shape phase for each beam of the set of second beams associated with the beam zone.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart of a method of wireless communication.

FIG. 9 is a flowchart of a method of wireless communication.

FIG. 10 is a flowchart of a method of wireless communication.

DETAILED DESCRIPTION

Figure 1:
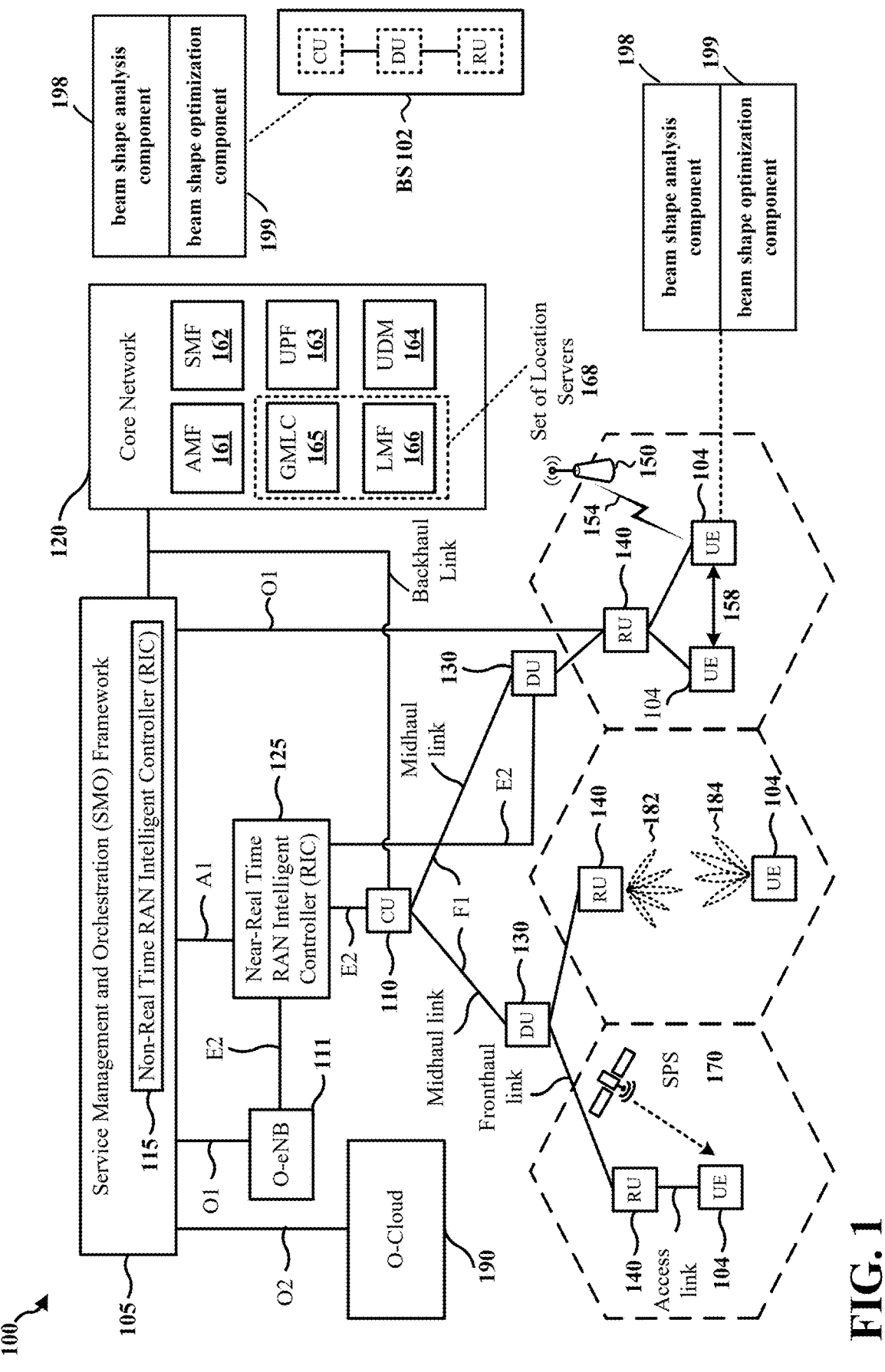
FIG. 1 is a diagram illustrating an example of a wireless communications system and an access network.

Spectral efficiency of communications between wireless devices may be improved by analyzing full beam shapes of transmission beams and reception beams at transceivers of the wireless devices. Transmitting such beam shape information may utilize a great deal of resources, particularly if the resolution of such beam shapes is high. The efficiency of transmitting the beam shape information for a channel may be improved by partitioning a panel into a series of beam zones, where each beam zone may have a first beam representative of the beam zone. When transmitting beam shape information for a panel associated with a channel, a wireless device may transmit, for each beam zone, the full beam shape of the first beam representative of the beam zone, and for each of the other beams in the beam zone (i.e., a set of second beams associated with the zone) a difference in beam shape amplitude for each beam as compared with the first beam, and/or a difference in beam shape phase for each beam as compared with the first beam. In other words, instead of transmitting a full beam shape for each beam in a channel, a wireless device may transmit a zone map of a plurality of beam zones, and for each zone a prototypical beam shape and a series of differences in both azimuth angles (e.g., $\Delta\phi$) and elevation angles (e.g., $\Delta\theta$) from the prototypical beam shape.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a beam shape analysis component 198 configured to receive a set of indications for each beam zone of a plurality of beam zones. The set of indications, for each beam zone, may include (i) a first indication of a full beam shape of a first beam associated with the beam zone, and (ii) a second indication of a first difference in beam shape amplitude for each beam of a set of second beams associated with the beam zone and (iii) a third indication of a second difference in beam shape phase for each beam of the set of second beams associated with the beam zone. The beam shape analysis component 198 may be configured to derive at least one of an AoA or an AoD of a channel based on the set of indications for each beam zone of the plurality of beam zones. In certain aspects, the UE 104 and/or the base station 102 may have a beam shape optimization component 199 configured to partition a panel of the second wireless device into a plurality of beam zones. Each beam zone of the plurality of beam zones may be associated with a first beam and a set of second beams. The beam shape optimization component 199 may be configured to transmit a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone. Although the following description may be focused on 5G NR, the concepts described herein may be applicable to other similar areas, such as LTE, LTE-A, CDMA, GSM, and other wireless technologies.

Figure 2:
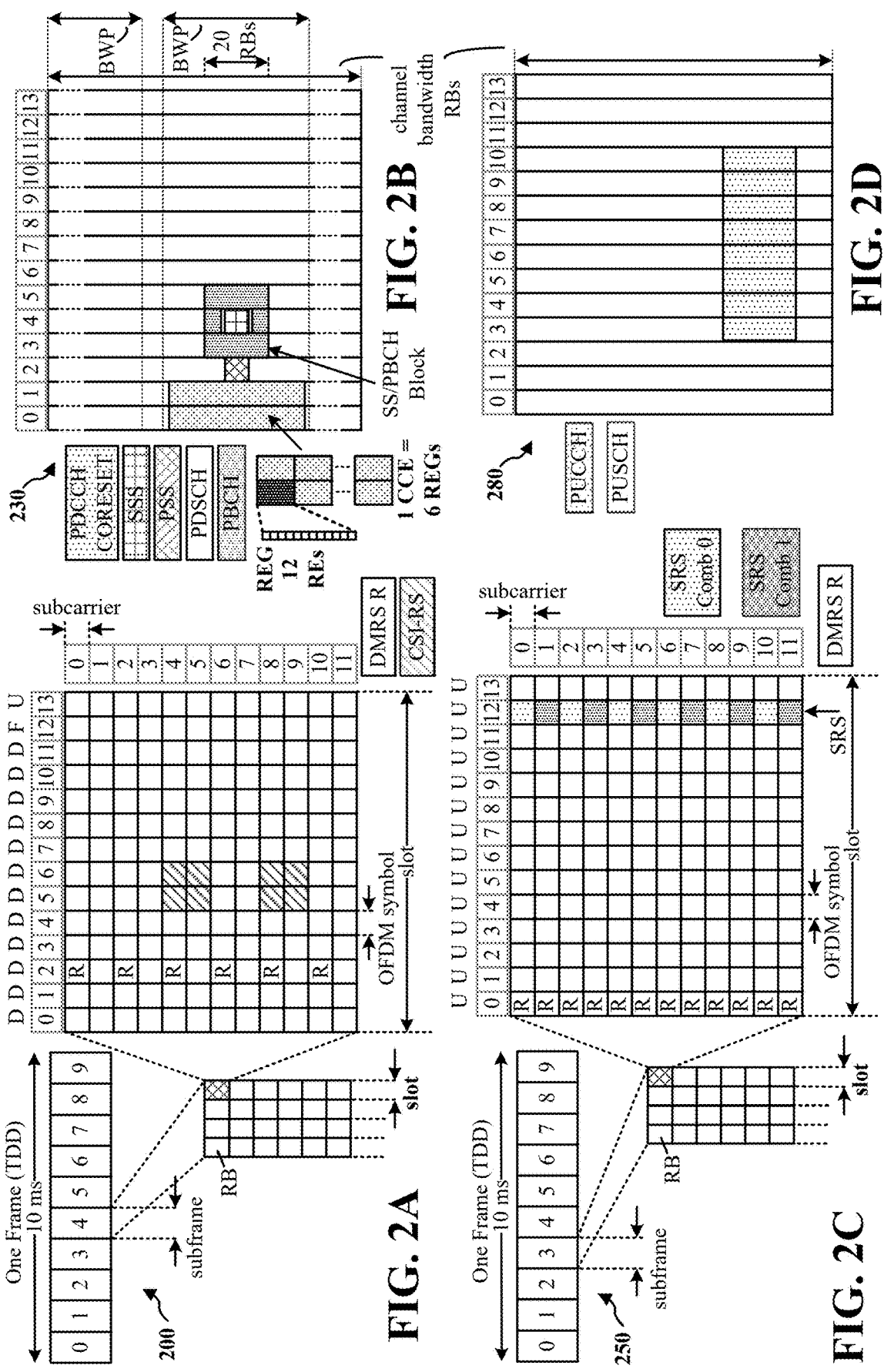
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

Table 1: Numerology, SCS, and CP

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
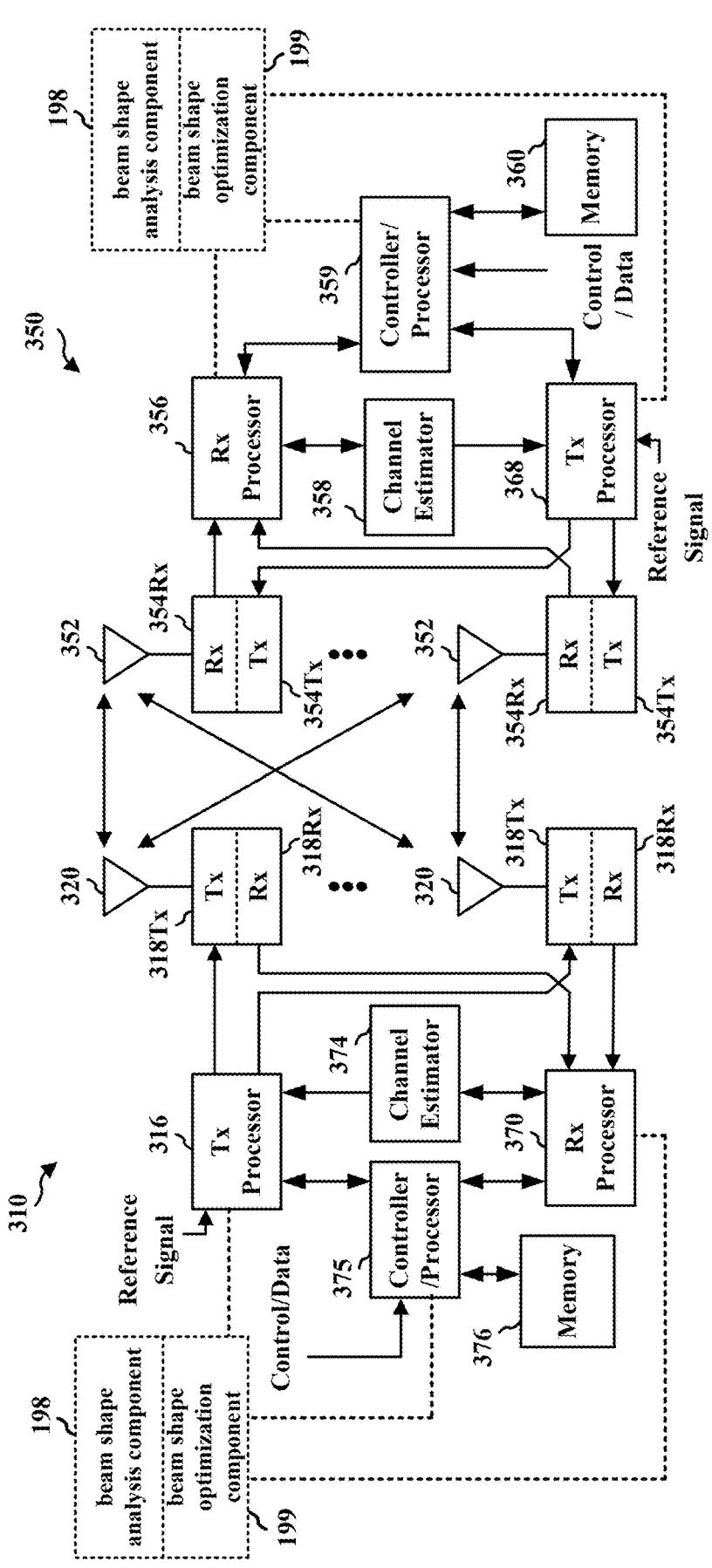
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the beam shape analysis component 198 of FIG. 1.

At least one of the Tx processor 368, the Rx processor 356, and the controller/processor 359 may be configured to perform aspects in connection with the beam shape optimization component 199 of FIG. 1.

At least one of the Tx processor 316, the Rx processor 370, and the controller/processor 375 may be configured to perform aspects in connection with the beam shape analysis component 198 of FIG. 1.

At least one of the Tx processor 316, the Rx processor 370, and the controller/processor 375 may be configured to perform aspects in connection with the beam shape optimization component 199 of FIG. 1.

Figure 4:
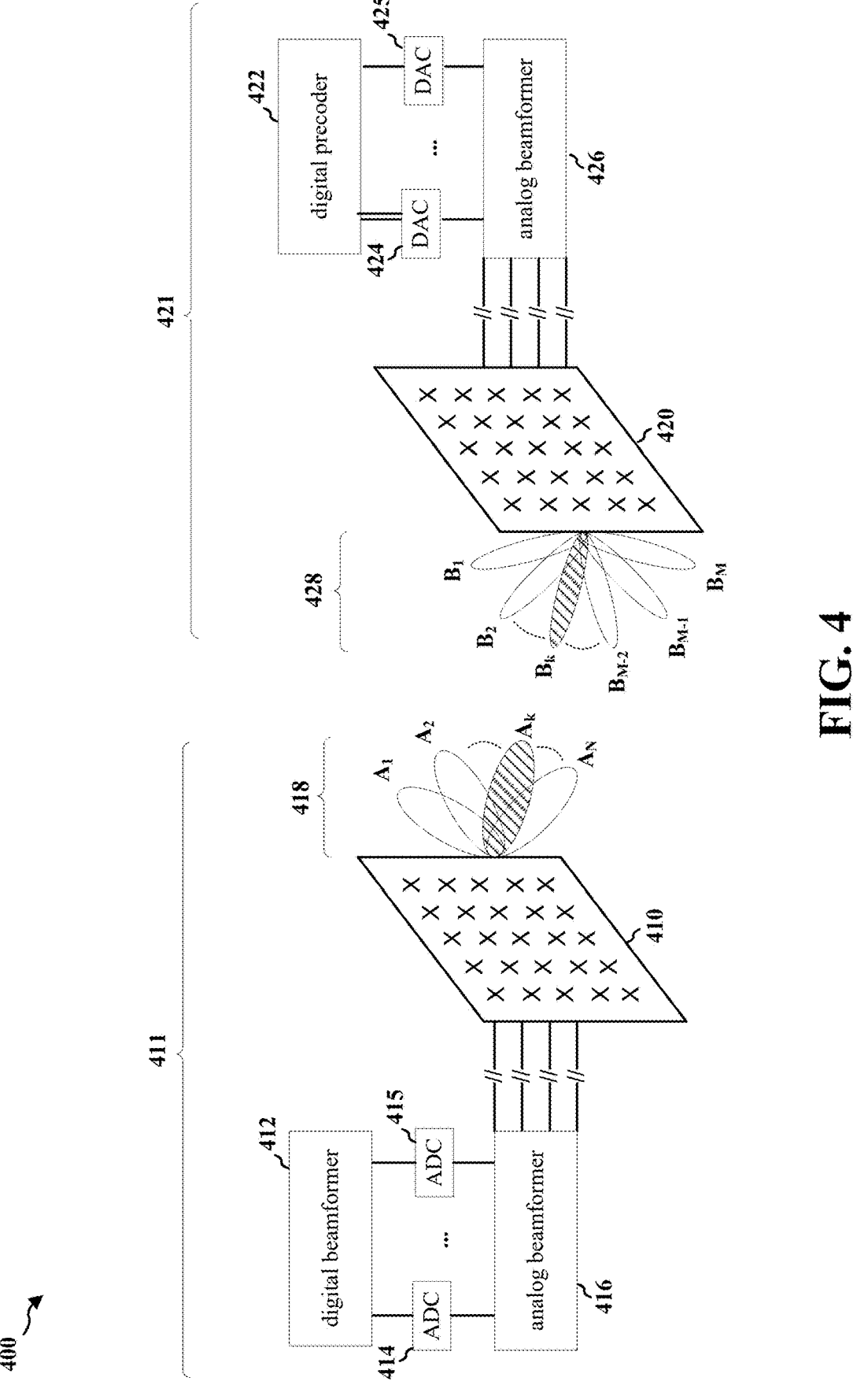
FIG. 4 is a diagram illustrating an example of a first wireless device that transmits a beam and a second wireless device that receives the beam, in accordance with various aspects of the present disclosure.

FIG. 4 is a diagram 400 illustrating an example of a wireless device 421 that transmits a beam using a panel 420 and a wireless device 411 that receives the beam using the panel 410. The wireless device 421 may be a UE, such as the UE 104 in FIG. 1, or a network node, such as the base station 102 in FIG. 1. The wireless device 411 may be a UE, such as the UE 104 in FIG. 1, or a network node, such as the base station 102 in FIG. 1. In one aspect, the wireless device 421 may be a UE and the wireless device 411 may be a base station, and the wireless device 421 may receive a downlink transmission from the wireless device 411.

The wireless device 421 may have a digital precoder 422 that may be configured to encode data that is fed to a series of digital to analog converters (DACs) 424 to 425. The data from the digital precoder 422 may be represented by a digital precoding matrix P, or $N_{TP} \times N_{SS}$. The DACs may provide analog signals to the analog beamformer 426. The analog signals from the analog beamformer 426 may be represented by a transmission analog beamforming matrix B, or $N_{Tx} \times N_{TP}$. The analog beamformer 426 may form beams, which may be provided to the panel 420 having a plurality of elements that form a series of beams 428 in a channel, illustrated as beams $B_1$ to $B_M$. The wireless device 411 may monitor the beams 418 in a channel, illustrated as beams $A_1$ to $A_N$. The channel matrix between the panel 420 and the panel 410 may be represented as a raw channel matrix H, or $N_{Rx} \times N_{Tx}$. The raw channel matrix H may be defined by at least one of a function of core parameters, a number of clusters and per cluster AoA, a number of clusters and per cluster AoD, a number of clusters and per cluster zone of arrival (ZoA), a number of clusters and per cluster zone of departure (ZoD), delays, or powers. The signal received by the panel 410 may be provided to the analog beam former 416. The analog beam signal formed by the analog beam former 416 may be represented by a reception analog beamforming matrix A, or $N_{RP} \times N_{Rx}$. The analog beam signal may be fed through the analog to digital converters (ADCs) 414 to 415, which may then feed the digital signal to the digital beamformer 412 for processing. The hybrid beamforming input/output relationship per tone for the transmission from the wireless device 421 to the wireless device 411 may be represented as y=AHBPx+n, where x may be the input signal and n may be noise received by the panel 410.

The wireless device 411 and/or the wireless device 421 may use a plurality of Tx and Rx beamformed measurements, such as $A_iHB_j$ to infer some information about the raw channel H. In one aspect, the wireless device 411 and/or the wireless device 421 may use dynamic codebook adaptation to create custom non-codebook-based analog beams to improve a capacity of the beams. In another aspect, the wireless device 411 and/or the wireless device 421 may predict an oversampled codebook index through non-oversampled codebook measurements to reduce an overhead of the transmitted and received beams. The series of beams 428 may have a beam Bk that represents the strongest transmission beam from the panel 420 to the panel 410. The series of beams 418 may have a beam Ak that represents the strongest reception beam monitored by the panel 410 from the panel 420. With beam shape information from the wireless device 421, the wireless device 411 may be able to estimate at least one of the AoD of the beam Bk and the AoA of the beam Ak to determine the strongest beam pair between the panel 410 and the panel 420. With beam zone information from the wireless device 421, the wireless device 411 may be able to estimate the ZoD of the beam Bk and the ZoA of the beam Ak to determine the strongest zone pair between the panel 410 and the panel 420. One way to analyze the beams transmitted by the panel 420 and received by the panel 410 may be to divide the angular space at the wireless device 421 and the wireless device 411 into grids.

Figure 5:
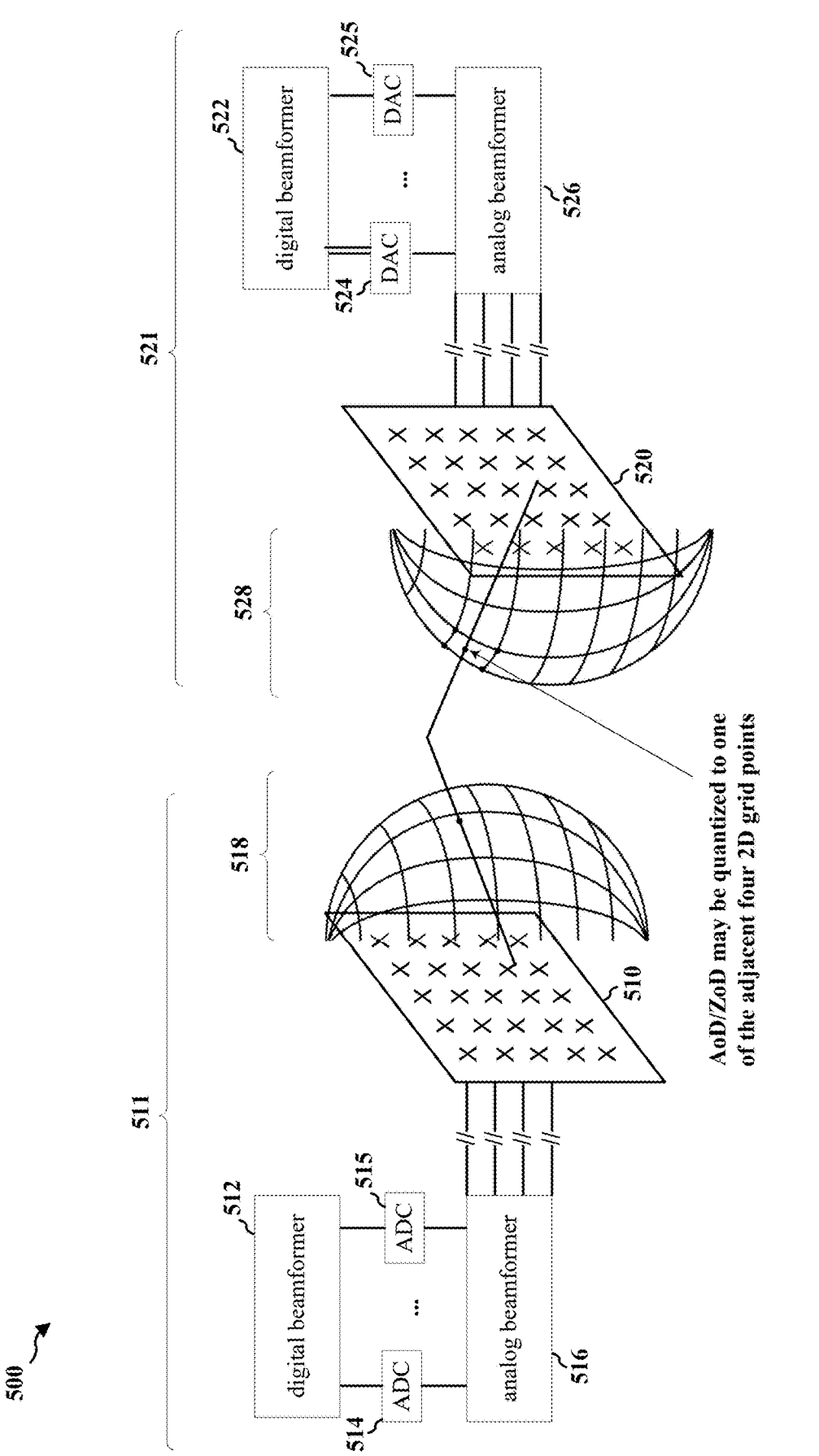
FIG. 5 is a diagram illustrating an example of a first wireless device and a second wireless device plotting element responses using a two dimensional (2D) angular grid, in accordance with various aspects of the present disclosure.

FIG. 5 is a diagram 500 illustrating an example of a wireless device 521 and a wireless device 511, similar to the wireless device 421 and the wireless device 411 in FIG. 4, which may plot element responses using a two dimensional (2D) angular grid 528 and a 2D angular grid 518, respectively.

Similar to the wireless device 421 in FIG. 4, the wireless device 521 may have a digital precoder 522 that may be configured to encode data that is fed to a series of DACs 524 to 525. The data from the digital precoder 522 may be represented by a digital precoding matrix P, or $N_{TP} \times N_{SS}$. The DACs may provide analog signals to the analog beamformer 526. The analog signals from the analog beamformer 526 may be represented by a transmission analog beamforming matrix B, or $N_{Tx} \times N_{TP}$. The analog beamformer 526 may form beams, which may be provided to the panel 520 having a plurality of elements that form a series of beams in a channel, illustrated as beams $B_1$ to $B_M$. The wireless device 511 may monitor the beams in a channel, illustrated as beams $A_1$ to $A_N$. The channel matrix between the panel 520 and the panel 510 may be represented as a raw channel matrix H, or $N_{Rx} \times N_{Tx}$. The raw channel matrix H may be defined by at least one of a function of core parameters, a number of clusters and per cluster AoA, a number of clusters and per cluster AoD, a number of clusters and per cluster ZoA, a number of clusters and per cluster ZoD, delays, or powers. The signal received by the panel 510 may be provided to the analog beam former 516. The analog beam signal formed by the analog beam former 516 may be represented by a reception analog beamforming matrix A, or $N_{RP} \times N_{Rx}$. The analog beam signal may be fed through the ADCs 514 to 515, which may then feed the digital signal to the digital beamformer 512 for processing. The hybrid beamforming input/output relationship per tone for the transmission from the wireless device 521 to the wireless device 511 may be represented as y=AHBPx+n, where x may be the number of elements of the panel 510 and n may be noise received by the panel 510.

The angular space at the panel 510 may be divided into a grid of size $N_{510azi} \times N_{510elev}$. $N_{510azi}$ may be an azimuth indicator of a beam at panel 510 and $N_{510elev}$ may be an elevation indicator of a beam at panel 510. A number of antennas at the wireless device 511 may be represented by $N_{510nant}$. The angular space at the panel 520 may divided into a grid of size $N_{520azi}$ and $N_{520elev}$. $N_{520azi}$ may be an azimuth indicator of a beam at panel 520 and $N_{520elev}$ may be an elevation indicator of a beam at panel 520. A number of antennas at the wireless device 521 may be represented by $N_{520ant}$. A panel at a network node may have a grid size of 32×32. A panel at a UE may have a grid size of 16×16.

A dth delay tap of a quantized channel model may be represented as $$H_d \approx P_R \Delta_d^q P_T^*$$

$P_R$ may be a receiver element response matrix at the panel 510. In other words, $P_R$ may be the element response computed at the 2D angular grid 518.

$$P_T^*$$

may be a transmitter element response matrix at the panel 520. In other words, $$P_T^*$$

may be the element response computed at the 2D angular grid 528.

In other words, $P_R$ may be estimated as $P_R$: $[N_{510ant} \times [N_{510azi} \times N_{510elev}]]$, $$\Delta_d^q$$

mg be estimated as $$\Delta_d^q\colon [N_{510azi} \times N_{510elev}] \times [N_{520azi} \times N_{520elev}],$$

and $$P_T^*$$

may be estimated as $$P_T^*\colon [[N_{520azi} \times N_{520elev}] \times N_{520ant}]$$

For example, in an aspect where the panel 510 may have a grid size of 16×16 with 8 antennas and the panel 520 may have a grid size of 64×32 with 64 antennas, the angular space at the 2D angular grids 518 and 528 may be represented by $P_R$: [8×[16×16]], $$\Delta_d^q\colon [16 \times 16] \times [64 \times 32],$$
$$P_T^*\colon [[64 \times 32] \times 64].$$

Such values may be typical where panel 510 is on a UE wireless device and panel 52 is on a network node wireless device.

In some aspects, a wireless device, such as the wireless device 411 in FIG. 4 or the wireless device 511 in FIG. 5, may perform sparse recovery of a mmWave channel using at least one of an estimated AoA angle or an estimated AoD angle to improve the spectral efficiency for wireless devices in a system. In some aspects, a wireless device, such as the wireless device 411 in FIG. 4 or the wireless device 511 in FIG. 5, may create a custom non-codebook-based beam along an estimated AoA and/or AoD angle to improve the spectral efficiency for wireless devices in a system. In order to accurately estimate the AoA and/or AoD angle of the strongest beam pair between panels, the transmitting wireless device (e.g., wireless device 421 in FIG. 4 or the wireless device 521 in FIG. 5) may indicate a beam shape for a plurality of beams to the receiving wireless device (e.g., wireless device 411 in FIG. 4 or the wireless device 511 in FIG. 5). Indicating a full beam shape can use a great deal of overhead, as a full beam shape may include amplitude and phase values for every portion of a plot of a main lobe and multiple side lobes for each beam transmitted by a panel. For example, 33 million parameters may be needed to convey a full beam shape having one degree of resolution in both azimuth and elevation on a grid. Conveying a full beam shape for every beam may use excessive overhead.

Less overhead may be used to convey a plurality of beams by enabling a transmitting wireless device to partition the angular space in both azimuth and elevation into a plurality of zones. For each zone, the transmitting wireless device may define the beam shape of a first beam, such as a prototypical beam. For each zone, the transmitting wireless device may define the other beam shapes in the zone in terms of the first beam shifted by a difference of an azimuth angle and by a difference of elevation. The receiving wireless device may receive a transmission of the partitioned zones with a full beam shape of the first beam for a defined zone and azimuth/elevation differentials for the other beams in the defined zone. The receiving device may derive optimal AoA and/or AoD values for the strongest transmission beam and reception beam for the channel based on the received beam information. The estimated AoA and/or AoD values may be used to select a transmission beam or reception beam, to define a custom non-codebook-based beam, and/or to perform sparse recovery of an mmWave channel.

In other words, the transmitting wireless device may be configured to partition a panel of the second wireless device into a plurality of beam zones. Each beam zone of the plurality of beam zones may be associated with a first beam and a set of second beams. The transmitting wireless device may be configured to transmit a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone. The receiving wireless device may be configured to receive a set of indications for each beam zone of a plurality of beam zones. The set of indications, for each beam zone, may include (i) a first indication of a full beam shape of a first beam associated with the beam zone, and (ii) a second indication of a first difference in beam shape amplitude for each beam of a set of second beams associated with the beam zone and (iii) a third indication of a second difference in beam shape phase for each beam of the set of second beams associated with the beam zone. The beam shape analysis component 198 may be configured to derive at least one of an AoA or an AoD of a channel based on the set of indications for each beam zone of the plurality of beam zones.

Figure 6:
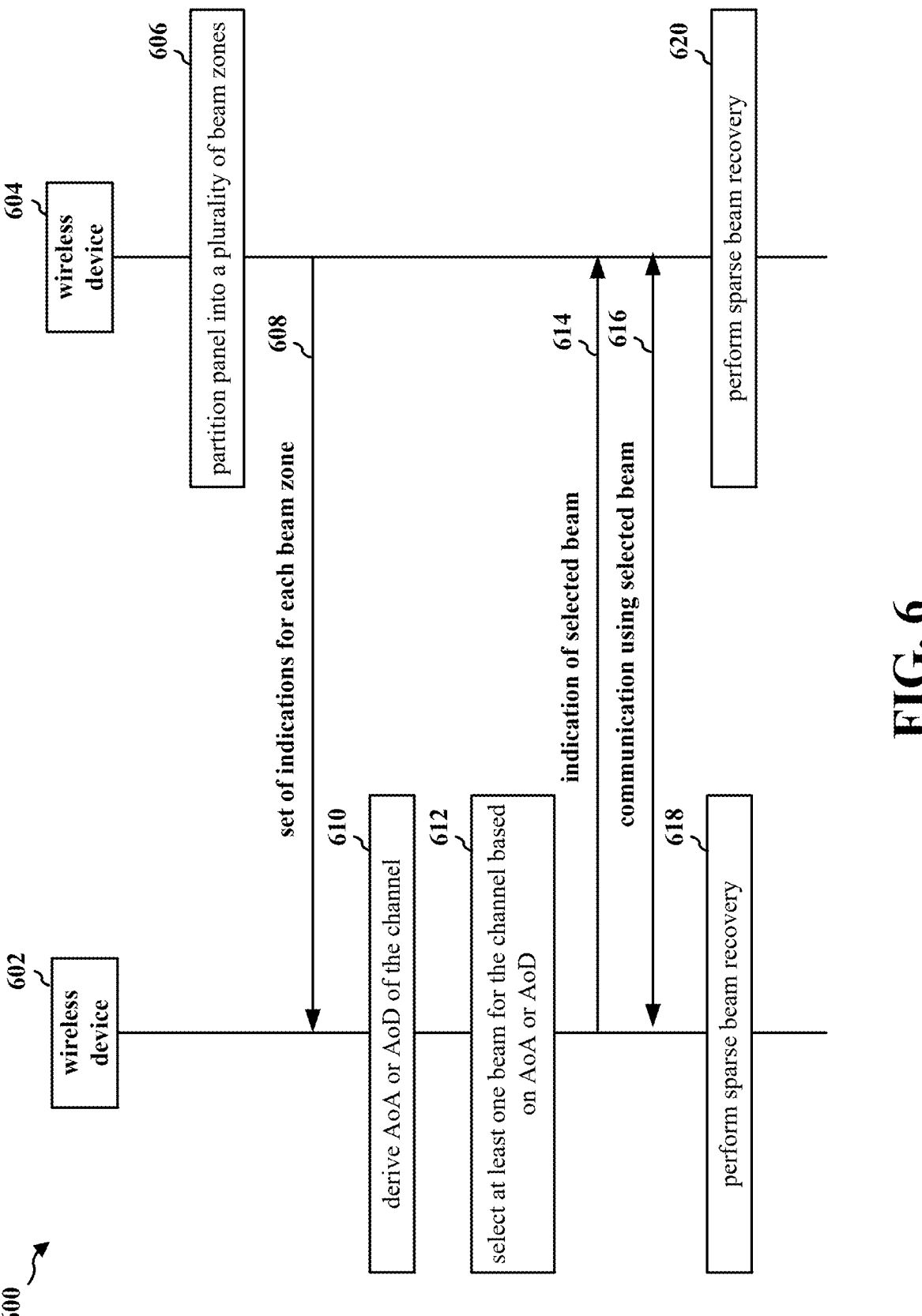
FIG. 6 is a connection flow diagram illustrating a pair of wireless devices configured to efficiently exchange beam shape information.

FIG. 6 is a connection flow diagram 600 illustrating a wireless device 602 and a wireless device 604 configured to efficiently exchange beam shape information. The wireless device 602 may be the UE 104 or the base station 102 in FIG. 1 or the UE 350 or the base station 310 in FIG. 3. The wireless device 604 may be the UE 104 or the base station 102 in FIG. 1 or the UE 350 or the base station 310 in FIG. 3. If bot the wireless device 602 and the wireless device 604 are UEs, the wireless device 602 and the wireless device 604 may communicate via sidelink.

At 606, the wireless device 604 may partition a panel into a plurality of beam zones. The wireless device 604 may partition the panel based on an overlapping beam volume or an overlapping beam area that does not diverge beyond a threshold level. For example, the wireless device 604 may define each zone as having beams that each have an overlapping volume that do not diverge by more than 10% from any other beam in the zone, or may define each zone as having beams that have an overlapping area that do not diverge by more than 10% from any other beam in the zone. In another example, the wireless device 604 may define each zone as having beams that each have an overlapping volume that do not diverge by more than 10% from a reference beam, or a selected beam, in the zone, or may define each zone as having beams that have an overlapping area that do not diverge by more than 10% from a reference beam, or a selected beam, in the zone. The wireless device 604 may select a beam for each zone as the first beam whose full beam shape will be output to the wireless device 602. The wireless device 604 may define all of the other beams in each zone by a difference in beam shape phase and/or a difference in beam shape amplitude as compared with the first beam. In other words, the difference may be in an azimuth angle (e.g., $\Delta\phi$) and/or in an elevation angle (e.g., $\Delta\theta$). For example, a second beam in a zone may be defined by a beam shape phase offset from the first beam in the zone, and/or may be defined by a beam shape amplitude offset from the first beam in the zone. While that second beam may not have the same beam shape as the first beam, the difference may not be very large as the overlapping volume or overlapping area of both beams may not diverge by more than a threshold value from one another. The first beam may be a prototypical beam of the zone. A prototypical beam may be a beam that has an overlapping volume or an overlapping area that has the least divergence, in total, as compared with all other beams in a zone. For example, the wireless device 604 may select the first beam based on an overlapping volume or an overlapping area that diverges the least from all other beams within the zone.

The wireless device 604 may output the set of indications 608 for each beam zone to the wireless device 602. The wireless device 602 may obtain the set of indications 608 from the wireless device 604. The wireless device 604 may output the set of indications 608 as an RRC configuration to the wireless device 602. The set of indications may be an RRC configuration. The beam shapes may be any suitable signal, such as sounding reference signals (SRSs), synchronization signal blocks (SSBs) or channel state information (CSI) reference signals (CSI-RSs). The beam shapes may include all known beam shapes of a channel that the wireless device 604 uses to communicate with the wireless device 602. The set of indications 608 may include at least one of a definition of a plurality of zones for a panel of the wireless device 604, a full beam shape of a first beam for each zone of the plurality of zones, a tolerance level in terms of gain and/or phase deviations for the full beam shape of the first beam for each zone of the plurality of zones, an uncertainty level in terms of gain and/or phase deviations for the full beam shape of the first beam for each zone of the plurality of zones, a difference in beam shape amplitude for each beam of a set of second beams for each zone of the plurality of zones, a difference in beam shape phase for each beam of the set of second beams for each zone of the plurality of zones, a beam width direction (e.g., 3 dB beam width direction) for each beam of the set of second beams for each zone of the plurality of zones, or a boresight direction (e.g., 3 dB boresight direction) for each beam of the set of second beams for each zone of the plurality of zones. The beam shape may be signaled as a function of frequency.

At 610, the wireless device 602 may derive at least one of an AoA or an AoD of the channel based on the set of indications 608 received from the wireless device 604. At

612, the wireless device 602 may select at least one beam for the channel based on the AoA and/or the AoD that was/were derived at 610. In one aspect, the selected beam may be a DL UE Rx beam. In another aspect, the selected beam may be a custom non-codebook-based beam along the estimated AoA and/or AoD angles. The UE may be configured to estimate the channel AoD based on a base station that is configured to create a custom beam along the AoD direction. After the UE and base station have updated their beams, the UE and base station may communicate via the custom (i.e., non-codebook-based) beams. The wireless device 602 may select both a transmission beam and a reception beam, such as a transmission beam from the wireless device 604, a reception beam to the wireless device 602, a transmission beam from the wireless device 602, or a reception beam to the wireless device 604.

The wireless device 602 may improve the spectral efficiency for communication between the wireless device 602 and the wireless device 604 in a plurality of ways. In one aspect, the wireless device 602 may output an indication 614 of a set of selected beams to the wireless device 604. The wireless device 604 may obtain the indication 614 of the set of selected beams from the wireless device 602. The indication 614 of the set of selected beams may also include an indication of a derived AoA and/or a derived AoD at 610. The set of selected beams may include a custom non-codebook-based beam. The set of selected beams may include at least one of a transmission beam and/or a reception beam. The wireless device 604 may use a transmission beam of the set of selected beams to transmit one or more signals to the wireless device 602 as the communication 616 using a beam selected at 612. The wireless device 604 may use a reception beam of the set of selected beams to receive one or more from the wireless device 602 as the communication 616 using a beam selected at 612. In another aspect, the wireless device 602 may transmit one or more signals using at least one of the selected beams to the wireless device 604 as the communication 616 using a beam selected at 612. In another aspect, the wireless device 602 may receive one or more signals using at least one of the selected beams from the wireless device 604. In another aspect, the wireless device 602 may perform sparse beam recovery at 618 based on at least one of the set of selected beams, or based on the derived AoA and/or AoD of the channel. In another aspect, the wireless device 604 may perform sparse beam recovery at 620 based on the indication 614 of the set of selected beams.

FIG. 7 is a flowchart 700 of a method of wireless communication. The method may be performed by a first wireless device (e.g., the UE 104, the UE 350; the base station 102, the base station 310; the wireless device 411, the wireless device 511, the wireless device 602; the apparatus 1104; the network entity 1102, the network entity 1202, the network entity 1360). At 702, the first wireless device may receive a set of indications for each beam zone of a plurality of beam zones. The set of indications, for each beam zone, may include (i) a first indication of a full beam shape of a first beam associated with the beam zone, (ii) a second indication of a first difference in beam shape amplitude for each beam of a set of second beams associated with the beam zone and (iii) a third indication of a second difference in beam shape phase for each beam of the set of second beams associated with the beam zone. For example, 702 may be performed by the wireless device 602 in FIG. 6, which may receive a set of indications 608 for each beam zone of a plurality of beam zones. The set of indications 608, for each beam zone, may include at least one of (i) a first indication of a full beam shape of a first beam associated with the beam zone, (ii) a second indication of a first difference in beam shape amplitude for each beam of a set of second beams associated with the beam zone, or (iii) a third indication of a second difference in beam shape phase for each beam of the set of second beams associated with the beam zone. Moreover, 702 may be performed by the component 198 in FIGS. 9-11.

At 704, the first wireless device may derive at least one of an AoA or an AoD of a channel based on the set of indications for each beam zone of the plurality of beam zones. For example, 704 may be performed by the wireless device 602 in FIG. 6, which, at 610, may derive an AOA and/or an AoD of a channel based on the set of indications 608 for each beam zone of the plurality of beam zones. Moreover, 704 may be performed by the component 198 in FIGS. 9-11.

Figure 8:
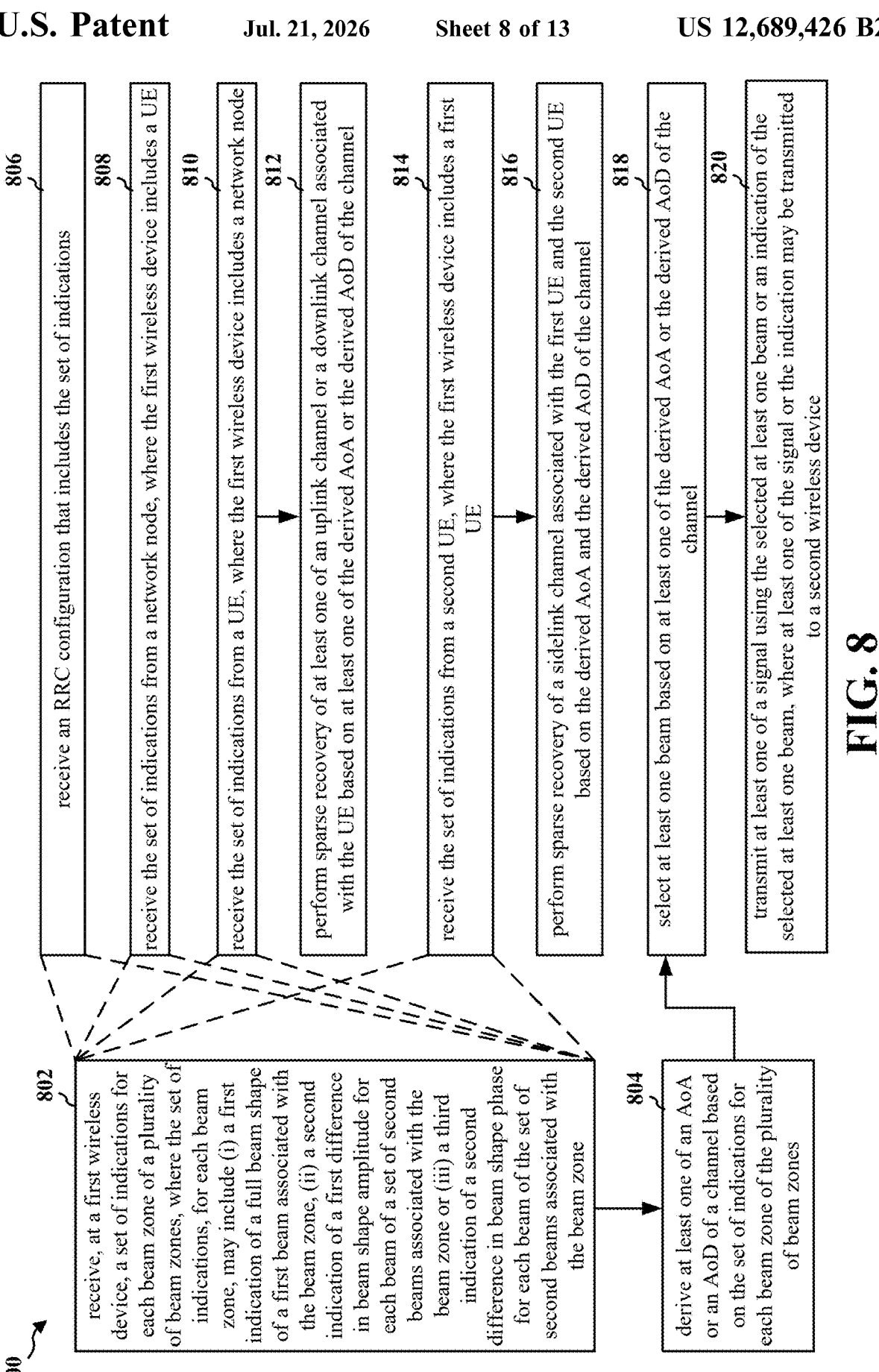
FIG. 8 is a flowchart of a method of wireless communication.

FIG. 8 is a flowchart 800 of a method of wireless communication. The method may be performed by a first wireless device (e.g., the UE 104, the UE 350; the base station 102, the base station 310; the wireless device 411, the wireless device 511, the wireless device 602; the apparatus 1104; the network entity 1102, the network entity 1202, the network entity 1360). At 802, the first wireless device may receive a set of indications for each beam zone of a plurality of beam zones. The set of indications, for each beam zone, may include at least one of (i) a first indication of a full beam shape of a first beam associated with the beam zone, (ii) a second indication of a first difference in beam shape amplitude for each beam of a set of second beams associated with the beam zone, or (iii) a third indication of a second difference in beam shape phase for each beam of the set of second beams associated with the beam zone. For example, 802 may be performed by the wireless device 602 in FIG. 6, which may receive a set of indications 608 for each beam zone of a plurality of beam zones. The set of indications 608, for each beam zone, may include (i) a first indication of a full beam shape of a first beam associated with the beam zone, (ii) a second indication of a first difference in beam shape amplitude for each beam of a set of second beams associated with the beam zone, or (iii) a third indication of a second difference in beam shape phase for each beam of the set of second beams associated with the beam zone. Moreover, 802 may be performed by the component 198 in FIGS. 9-11.

At 804, the first wireless device may derive at least one of an AoA or an AoD of a channel based on the set of indications for each beam zone of the plurality of beam zones. For example, 804 may be performed by the wireless device 602 in FIG. 6, which, at 610, may derive an AOA and/or an AoD of a channel based on the set of indications 608 for each beam zone of the plurality of beam zones. Moreover, 804 may be performed by the component 198 in FIGS. 9-11.

At 806, the first wireless device may receive an RRC configuration that includes the set of indications. For example, 806 may be performed by the wireless device 602 in FIG. 6, which may receive an RRC configuration that includes the set of indications 608. The set of indications 608 may be the RRC configuration. Moreover, 806 may be performed by the component 198 in FIGS. 9-11.

At 808, the first wireless device may receive the set of indications from a network node. The first wireless device may include a UE. For example, 808 may be performed by the wireless device 602 in FIG. 6, which may be a UE. The wireless device 604 may be a network node. The wireless device 602 may receive the set of indications 608 from the wireless device 604. Moreover, 808 may be performed by the component 198 in FIGS. 10-11.

At 810, the first wireless device may receive the set of indications from a UE. The first wireless device may include a network node. For example, 810 may be performed by the wireless device 602 in FIG. 6, which may be a network node. The wireless device 604 may be a UE. The wireless device 602 may receive the set of indications 608 from the wireless device 604. Moreover, 810 may be performed by the component 198 in FIG. 9.

At 812, the first wireless device may, at 618, perform sparse recovery of at least one of an uplink channel or a downlink channel associated with the UE based on at least one of the derived AoA or the derived AoD of the channel. For example, 816 may be performed by the wireless device 602 in FIG. 6, which may perform sparse recovery of at least one of an uplink channel or a downlink channel associated with the wireless device 602 based on the derived AoA and/or the derived AoD of the channel at 610. Moreover, 816 may be performed by the component 198 in FIGS. 9-11.

At 814, the first wireless device may receive the set of indications from a second UE. The first wireless device may include a first UE. For example, 814 may be performed by the wireless device 602 in FIG. 6, which may be a first UE. The wireless device 604 may be a second UE. The wireless device 602 may receive the set of indications 608 from the wireless device 604. Moreover, 814 may be performed by the component 198 in FIG. 9.

At 816, the first wireless device may perform sparse recovery of a sidelink channel associated with the first UE and the second UE based on at least one of the derived AoA or the derived AoD of the channel. For example, 816 may be performed by the wireless device 602 in FIG. 6, which, at 618, may perform sparse recovery of a sidelink channel associated with the wireless device 602 and the wireless device 604, which both may be UEs. The sparse recovery may be based on the derived AoA and/or the derived AoD of the channel at 610. Moreover, 814 may be performed by the component 198 in FIG. 9.

At 818, the first wireless device may select at least one beam based at least one of the derived AoA and the derived AoD of the channel. For example, 818 may be performed by the wireless device 602 in FIG. 6, which may, at 612, select at least one beam based on the derived AoA and/or the derived AoD of the channel. Moreover, 818 may be performed by the component 198 in FIGS. 9-11.

At 820, the first wireless device may transmit at least one of a signal using the selected at least one beam or an indication of the selected at least one beam. At least one of the signal or the indication may be transmitted to a second wireless device. For example, 820 may be performed by the wireless device 602 in FIG. 6, which may transmit a signal as communication 616 using a beam selected at 612 to the wireless device 604. The wireless device 602 may transmit an indication 614 of one or more selected beams to the wireless device 604. Moreover, 820 may be performed by the component 198 in FIGS. 9-11.

FIG. 9 is a flowchart 900 of a method of wireless communication. The method may be performed by a second wireless device (e.g., the UE 104, the UE 350; the base station 102, the base station 310; the wireless device 421, the wireless device 521, the wireless device 604; the apparatus 1104; the network entity 1102, the network entity 1202, the network entity 1360). At 902, the second wireless device may partition a panel of the second wireless device into a plurality of beam zones. Each beam zone of the plurality of beam zones may be associated with a first beam and a set of second beams. For example, 902 may be performed by the wireless device 604 in FIG. 6, which may, at 606, partition a panel of the wireless device 604 into a plurality of beam zones. Each beam zone of the plurality of beam zones may be associated with a first beam and a set of second beams. Moreover, 604 may be performed by the component 199 in FIGS. 9-11.

At 904, the second wireless device may transmit a set of indications for each beam zone of the plurality of beam zones. The set of indications, for each beam zone, may include at least one of (i) a first indication of a full beam shape of the first beam associated with the beam zone, (ii) a second indication of a first difference in beam shape amplitude for each beam of the set of second beams associated with the beam zone, or (iii) a third indication of a second difference in beam shape phase for each beam of the set of second beams associated with the beam zone. For example, 904 may be performed by the wireless device 604 in FIG. 6, which may transmit a set of indications 608 for each beam zone of the plurality of beam zones to the wireless device 602. The set of indications 608 may include, for each beam zone, at least one of (i) a first indication of a full beam shape of the first beam associated with the beam zone, (ii) a second indication of a first difference in beam shape amplitude for each beam of the set of second beams associated with the beam zone, or (iii) a third indication of a second difference in beam shape phase for each beam of the set of second beams associated with the beam zone. Moreover, 904 may be performed by the component 199 in FIGS. 9-11.

FIG. 10 is a flowchart 1000 of a method of wireless communication. The method may be performed by a second wireless device (e.g., the UE 104, the UE 350; the base station 102, the base station 310; the wireless device 421, the wireless device 521, the wireless device 604; the apparatus 1104; the network entity 1102, the network entity 1202, the network entity 1360). At 1002, the second wireless device may partition a panel of the second wireless device into a plurality of beam zones. Each beam zone of the plurality of beam zones may be associated with a first beam and a set of second beams. For example, 1002 may be performed by the wireless device 604 in FIG. 6, which may, at 606, partition a panel of the wireless device 604 into a plurality of beam zones. Each beam zone of the plurality of beam zones may be associated with a first beam and a set of second beams. Moreover, 604 may be performed by the component 199 in FIGS. 9-11.

At 1004, the second wireless device may transmit a set of indications for each beam zone of the plurality of beam zones. The set of indications, for each beam zone, may include at least one of (i) a first indication of a full beam shape of the first beam associated with the beam zone, (ii) a second indication of a first difference in beam shape amplitude for each beam of the set of second beams associated with the beam zone, or (iii) a third indication of a second difference in beam shape phase for each beam of the set of second beams associated with the beam zone. For example, 1004 may be performed by the wireless device 604 in FIG. 6, which may transmit a set of indications 608 for each beam zone of the plurality of beam zones to the wireless device 602. The set of indications 608 may include, for each beam zone, at least one of (i) a first indication of a full beam shape of the first beam associated with the beam zone, (ii) a second indication of a first difference in beam shape amplitude for each beam of the set of second beams associated with the beam zone, or (iii) a third indication of a second difference in beam shape phase for each beam of the set of second beams associated with the beam zone. Moreover, 1004 may be performed by the component 199 in FIGS. 9-11.

At 1006, the second wireless device may transmit an RRC configuration including the set of indications. For example, 1006 may be performed by the wireless device 604 in FIG. 6, which may transmit an RRC configuration including the set of indications 608. The set of indications 608 may be an RRC configuration. Moreover, 1006 may be performed by the component 199 in FIGS. 9-11.

At 1008, the second wireless device may transmit the set of indications to a UE. The second wireless device may include a network node. For example, 1008 may be performed by the wireless device 604 in FIG. 6, which may be a network node. The wireless device 602 may be a UE. The wireless device 604 may transmit the set of indications 608 to the wireless device 602. Moreover, 1008 may be performed by the component 199 in FIG. 9.

At 1010, the second wireless device may transmit the set of indications to a network node. The second wireless device may include a UE. For example, 1010 may be performed by the wireless device 604 in FIG. 6, which may be a UE. The wireless device 602 may be a network node. The wireless device 604 may transmit the set of indications 608 to the wireless device 602. Moreover, 1010 may be performed by the component 199 in FIGS. 10-11.

At 1012, the second wireless device may obtain at least one of a signal from a using a selected beam or an indication of the selected beam. At least one of the signal or the indication may be obtained from a second wireless device based on the set of indications for each beam zone of the plurality of beam zones. For example, 1012 may be performed by the wireless device 604 in FIG. 6, which may obtain a signal as communication 616 using the beam selected at 612, based on the set of indications 608 for each beam zone of the plurality of beam zones, from the wireless device 602. The wireless device 604 may obtain an indication 614 of the beam selected at 612, based on the set of indications 608 for each beam zone of the plurality of beam zones, from the wireless device 602. Moreover, 1012 may be performed by the component 199 in FIGS. 10-11.

Figure 11:
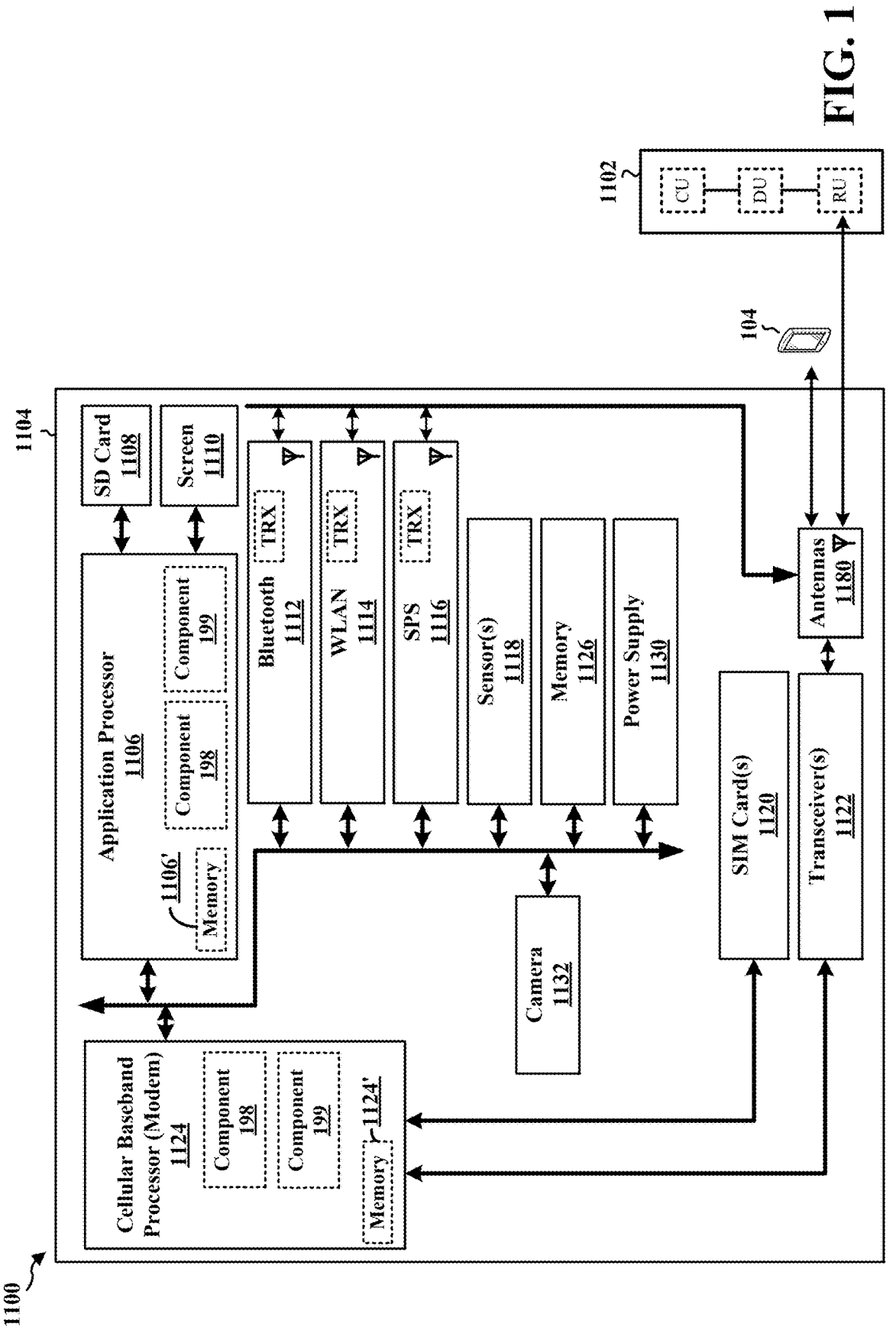
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer (s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver). The Bluetooth module

1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to receive a set of indications for each beam zone of a plurality of beam zones. The set of indications, for each beam zone, may include (i) a first indication of a full beam shape of a first beam associated with the beam zone, and (ii) a second indication of a first difference in beam shape amplitude for each beam of a set of second beams associated with the beam zone and (iii) a third indication of a second difference in beam shape phase for each beam of the set of second beams associated with the beam zone. The component 198 may be configured to derive at least one of an AoA or an AoD of a channel based on the set of indications for each beam zone of the plurality of beam zones. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for receiving a set of indications for each beam zone of a plurality of beam zones. The apparatus 1104 may include means for deriving at least one of an AoA or an AoD of a channel based on the set of indications for each beam zone of the plurality of beam zones. The apparatus 1104 may include means for selecting at least one beam based on at least one of the derived AoA or the derived AoD of the channel. The apparatus 1104 may include means for transmitting at least one of a signal using the selected at least one beam or an indication of the selected at least one beam. The apparatus 1104 may include means for receiving the set of indications for each beam zone of the plurality of beam zones by receiving the set of indications from a network node. The apparatus 1104 may include means for receiving the set of indications for each beam zone of the plurality of beam zones by receiving the set of instructions from a UE. The apparatus 1104 may include means for performing sparse recovery of at least one of an uplink channel or a downlink channel associated with the UE based on the derived AoA and the derived AoD of the channel. The apparatus 1104 may include means for receiving the set of indications for each beam zone of the plurality of beam zones by receiving the set of indications from a second UE. The apparatus 1104 may include means for performing sparse recovery of a sidelink channel associated with the first UE and the second UE based on the derived AoA and the derived AoD of the channel. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

As discussed supra, the component 199 may be configured to partition a panel of the second wireless device into a plurality of beam zones. Each beam zone of the plurality of beam zones may be associated with a first beam and a set of second beams. The component 199 may be configured to transmit a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone. The component 199 may be within the cellular baseband processor 1124, the application processor 1106, or both the cellular baseband processor 1124 and the application processor 1106. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for partitioning a panel of the second wireless device into a plurality of beam zones. The apparatus 1104 may include means for transmitting a set of indications for each beam zone of the plurality of beam zones. The apparatus 1104 may include means for transmitting the set of indications for each beam zone of the plurality of beam zones by transmitting an RRC configuration including the set of indications. The apparatus 1104 may include means for obtaining at least one of a signal from a using a selected beam or an indication of the selected beam. The apparatus 1104 may include means for transmitting the set of indications for each beam zone of the plurality of beam zones by transmitting the set of indications to a UE. The apparatus 1104 may include means for transmitting the set of indications for each beam zone of the plurality of beam zones by transmitting the set of indications to a network node. The means may be the component 199 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 12:
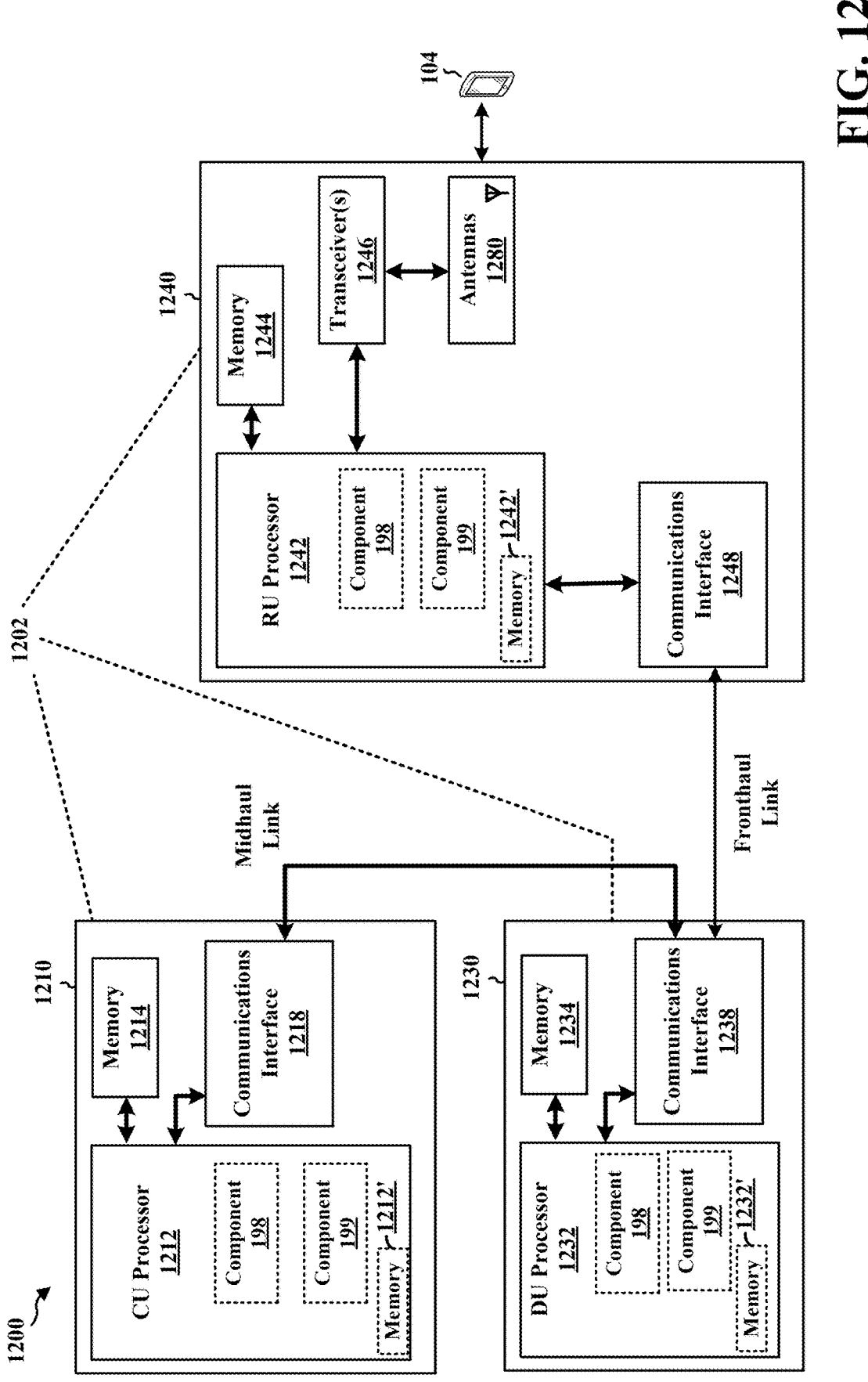
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a set of indications for each beam zone of a plurality of beam zones. The set of indications, for each beam zone, may include (i) a first indication of a full beam shape of a first beam associated with the beam zone, and (ii) a second indication of a first difference in beam shape amplitude for each beam of a set of second beams associated with the beam zone and (iii) a third indication of a second difference in beam shape phase for each beam of the set of second beams associated with the beam zone. The component 198 may be configured to derive at least one of an AoA or an AoD of a channel based on the set of indications for each beam zone of the plurality of beam zones. The component 198 may be within one or more processors of one or more of the CU 1210, DU 1230, and the RU 1240. The component 198 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for receiving a set of indications for each beam zone of a plurality of beam zones. The network entity 1202 may include means for deriving at least one of an AoA or an AoD of a channel based on the set of indications for each beam zone of the plurality of beam zones. The network entity 1202 may include means for selecting at least one beam based on at least one of the derived AoA or the derived AoD of the channel. The network entity 1202 may include means for transmitting at least one of a signal using the selected at least one beam or an indication of the selected at least one beam. The network entity 1202 may include means for receiving the set of indications for each beam zone of the plurality of beam zones by receiving the set of indications from a network node. The network entity 1202 may include means for receiving the set of indications for each beam zone of the plurality of beam zones by receiving the set of instructions from a UE. The network entity 1202 may include means for performing sparse recovery of at least one of an uplink channel or a downlink channel associated with the UE based on the derived AoA and the derived AoD of the channel. The network entity 1202 may include means for receiving the set of indications for each beam zone of the plurality of beam zones by receiving the set of indications from a second UE. The network entity 1202 may include means for performing sparse recovery of a sidelink channel associated with the first UE and the second UE based on the derived AoA and the derived AoD of the channel. The means may be the component 198 of the network entity 1202 configured to perform the functions recited by the means. As described supra, the network entity 1202 may include the Tx processor 316, the Rx processor 370, and the controller/processor 375. As such, in one configuration, the means may be the Tx processor 316, the Rx processor 370, and/or the controller/processor 375 configured to perform the functions recited by the means.

As discussed supra, the component 199 is configured to partition a panel of the second wireless device into a plurality of beam zones. Each beam zone of the plurality of beam zones may be associated with a first beam and a set of second beams. The component 199 may be configured to transmit a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for partitioning a panel of the second wireless device into a plurality of beam zones. The network entity 1202 may include means for transmitting a set of indications for each beam zone of the plurality of beam zones. The network entity 1202 may include means for transmitting the set of indications for each beam zone of the plurality of beam zones by transmitting an RRC configuration including the set of indications. The network entity 1202 may include means for obtaining at least one of a signal from a using a selected beam or an indication of the selected beam. The network entity 1202 may include means for transmitting the set of indications for each beam zone of the plurality of beam zones by transmitting the set of indications to a UE. The network entity 1202 may include means for transmitting the set of indications for each beam zone of the plurality of beam zones by transmitting the set of indications to a network node. The means may be the component 199 of the network entity 1202 configured to perform the functions recited by the means. As described supra, the network entity 1202 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 13:
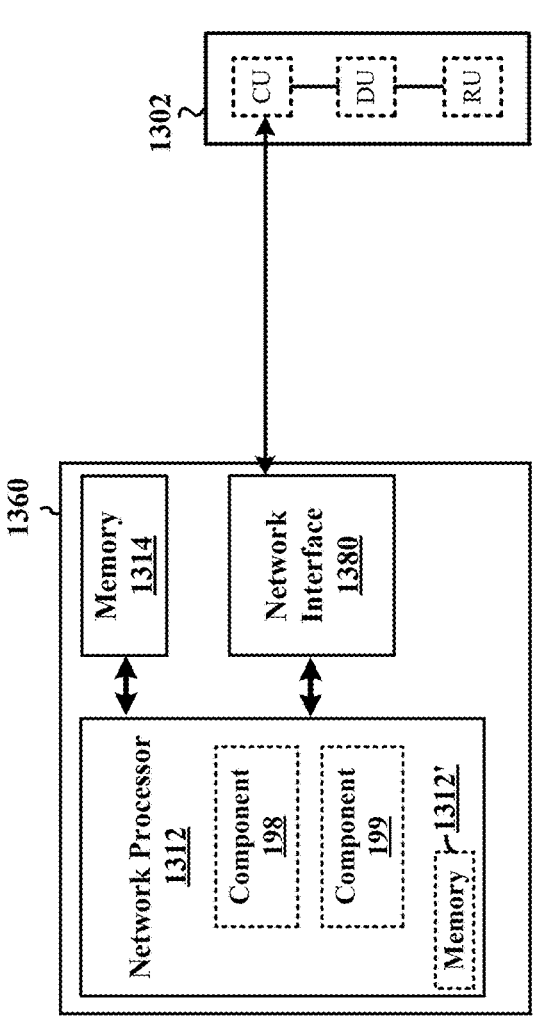
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a set of indications for each beam zone of a plurality of beam zones. The set of indications, for each beam zone, may include (i) a first indication of a full beam shape of a first beam associated with the beam zone, and (ii) a second indication of a first difference in beam shape amplitude for each beam of a set of second beams associated with the beam zone and (iii) a third indication of a second difference in beam shape phase for each beam of the set of second beams associated with the beam zone. The component 198 may be configured to derive at least one of an AoA or an AoD of a channel based on the set of indications for each beam zone of the plurality of beam zones. The component 198 may be within the processor 1312. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for receiving a set of indications for each beam zone of a plurality of beam zones. The network entity 1360 may include means for deriving at least one of an AoA or an AoD of a channel based on the set of indications for each beam zone of the plurality of beam zones. The network entity 1360 may include means for selecting at least one beam based on at least one of the derived AoA or the derived AoD of the channel. The network entity 1360 may include means for transmitting at least one of a signal using the selected at least one beam or an indication of the selected at least one beam. The network entity 1360 may include means for receiving the set of indications for each beam zone of the plurality of beam zones by receiving the set of indications from a network node. The network entity 1360 may include means for receiving the set of indications for each beam zone of the plurality of beam zones by receiving the set of instructions from a UE. The network entity 1360 may include means for performing sparse recovery of at least one of an uplink channel or a downlink channel associated with the UE based on the derived AoA and the derived AoD of the channel. The network entity 1360 may include means for receiving the set of indications for each beam zone of the plurality of beam zones by receiving the set of indications from a second UE. The network entity 1360 may include means for performing sparse recovery of a sidelink channel associated with the first UE and the second UE based on the derived AoA and the derived AoD of the channel. The means may be the component 198 of the network entity 1360 configured to perform the functions recited by the means.

As discussed supra, the component 199 is configured to partition a panel of the second wireless device into a plurality of beam zones. Each beam zone of the plurality of beam zones may be associated with a first beam and a set of second beams. The component 199 may be configured to transmit a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone. The component 199 may be within the processor 1312. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for partitioning a panel of the second wireless device into a plurality of beam zones. The network entity 1360 may include means for transmitting a set of indications for each beam zone of the plurality of beam zones. The network entity 1360 may include means for transmitting the set of indications for each beam zone of the plurality of beam zones by transmitting an RRC configuration including the set of indications. The network entity 1360 may include means for obtaining at least one of a signal from a using a selected beam or an indication of the selected beam. The network entity 1360 may include means for transmitting the set of indications for each beam zone of the plurality of beam zones by transmitting the set of indications to a UE. The network entity 1360 may include means for transmitting the set of indications for each beam zone of the plurality of beam zones by transmitting the set of indications to a network node. The means may be the component 199 of the network entity 1360 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include receiving a set of indications for each beam zone of a plurality of beam zones. The set of indications for each beam zone may include, (i) a first indication of a full beam shape of a first beam associated with the beam zone, (ii) a second indication of a first difference in beam shape amplitude and (iii) a third indication of a second difference in beam shape phase for each beam of a set of second beams associated with the beam zone. The method may include deriving at least one of an angle of arrival (AoA) or an angle of departure (AoD) of a channel based on the set of indications for each beam zone of the plurality of beam zones.

Aspect 2 is the method of aspect 1, where the set of indications, for each beam zone of the plurality of beam zones, may include a fourth indication of a beam width and a fifth indication of a boresight direction for each beam of the set of second beams associated with the beam zone.

Aspect 3 is the method of any of aspects 1 and 2, where the first indication of the full beam shape of the first beam may include at least one of a fourth indication of a gain deviation tolerance level or a fifth indication of a phase deviation tolerance level.

Aspect 4 is the method of any of aspects 1 to 3, where the first indication of the full beam shape of the first beam may include at least one of an amplitude or a phase for each azimuth and elevation in a grid for a main beam and a set of side beams associated with the full beam shape of the first beam.

Aspect 5 is the method of any of aspects 1 to 4, where receiving the set of indications for each beam zone of the plurality of beam zones may include receiving an RRC configuration including the set of indications.

Aspect 6 is the method of any of aspects 1 to 5, where the full beam shape of the first beam associated with each beam zone of the plurality of beam zones is based on a function of frequency of the full beam shape.

Aspect 7 is the method of any of aspects 1 to 6, where the channel may include at least one of an SSB channel or a CSI-RS channel.

Aspect 8 is the method of any of aspects 1 to 7, where the method may include selecting at least one beam based on at least one of the derived AoA or the derived AoD of the channel.

Aspect 9 is the method of aspect 8, where the method may include transmitting at least one of a signal using the selected at least one beam or an indication of the selected at least one beam. At least one of the signal or the indication may be transmitted to a second wireless device.

Aspect 10 is the method of any of aspects 1 to 9, where the first beam may include a prototypical beam. The set of second beams may include a set of non-prototypical beams.

Aspect 11 is the method of any of aspects 1 to 10, where the first wireless device may include a UE. Receiving the set of indications for each beam zone of the plurality of beam zones may include receiving the set of indications from a network node.

Aspect 12 is the method of any of aspects 1 to 11, where the first wireless device may include a network node. Receiving the set of indications for each beam zone of the plurality of beam zones may include receiving the set of instructions from a UE.

Aspect 13 is the method of aspect 12, where the channel may include an SRS channel.

Aspect 14 is the method of any of aspects 12 13, where the method may include performing sparse recovery of at least one of an uplink channel or a downlink channel associated with the UE based on the derived AoA and the derived AoD of the channel.

Aspect 15 is the method of any of aspects 1 to 14, where the first wireless device may include a first UE. Receiving the set of indications for each beam zone of the plurality of beam zones may include receiving the set of indications from a second UE.

Aspect 16 is the method of any of aspects 1 to 15, where the method may include performing sparse recovery of a sidelink channel associated with the first UE and the second UE based on the derived AoA and the derived AoD of the channel.

Aspect 17 is a method of wireless communication at a second wireless device, where the method may include partitioning a panel of the second wireless device into a plurality of beam zones. Each beam zone of the plurality of beam zones may be associated with a first beam and a set of second beams. The method may include transmitting a set of indications for each beam zone of the plurality of beam zones. The set of indications, for each beam zone, may include (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone.

Aspect 18 is the method of aspect 17, where each of the set of second beams may include an overlapping volume with the first beam that is greater than or equal to a threshold value.

Aspect 19 is the method of any of aspects 17 and 18, where each of the set of second beams may include an overlapping area with the first beam that is greater than or equal to a threshold value.

Aspect 20 is the method of any of aspects 17 to 18, where the set of indications, for each beam zone of the plurality of beam zones, may further include a fourth indication of a beam width and a fifth indication of a boresight direction for each beam of the set of second beams associated with the beam zone.

Aspect 21 is the method of any of aspects 17 to 19, where the first indication of the full beam shape of the first beam may include at least one of a fourth indication of a gain deviation tolerance level or a fifth indication of a phase deviation tolerance level.

Aspect 22 is the method of any of aspects 17 to 20, where the first indication of the full beam shape of the first beam may include at least one of an amplitude or a phase for each azimuth and elevation in a grid for a main beam and a set of side beams associated with the full beam shape of the first beam.

Aspect 23 is the method of any of aspects 17 and 22, where transmitting the set of indications for each beam zone of the plurality of beam zones may include transmitting an RRC configuration including the set of indications.

Aspect 24 is the method of any of aspects 17 to 23, where the full beam shape of the first beam associated with each beam zone of the plurality of beam zones may include a function of frequency of the full beam shape.

Aspect 25 is the method of any of aspects 17 to 24, where the method may include obtaining at least one of a signal from a using a selected beam or an indication of the selected beam. At least one of the signal or the indication may be obtained from a second wireless device based on the set of indications for each beam zone of the plurality of beam zones.

Aspect 26 is the method of any of aspects 17 to 25, where the first beam may include a prototypical beam. The set of second beams may include a set of non-prototypical beams.

Aspect 27 is the method of any of aspects 17 to 26, where the second wireless device may include a network node. Transmitting the set of indications for each beam zone of the plurality of beam zones may include transmitting the set of indications to a UE.

Aspect 28 is the method of any of aspects 17 to 27, where the second wireless device may include a UE. Transmitting the set of indications for each beam zone of the plurality of beam zones may include transmitting the set of indications to a network node.

Aspect 29 is an apparatus for wireless communication, including: a memory; and at least one processor coupled to the memory and, based at least in part on information stored in the memory, the at least one processor is configured to implement any of aspects 1 to 28.

Aspect 30 is the apparatus of aspect 29, further including at least one of an antenna or a transceiver coupled to the at least one processor.

Aspect 31 is an apparatus for wireless communication including means for implementing any of aspects 1 to 28.

Aspect 32 is a computer-readable medium (e.g., a non-transitory computer-readable medium) storing computer executable code, where the code when executed by a processor causes the processor to implement any of aspects 1 to 28.

What is claimed is:

1. An apparatus for wireless communication at a first wireless device, comprising:
   a memory; and
   at least one processor coupled to the memory and, based at least in part on information stored in the memory, the at least one processor is configured to:
   receive a set of indications for each beam zone of a plurality of beam zones, wherein the set of indications, for each beam zone, comprises (i) a first indication of a full beam shape of a first beam associated with the beam zone, (ii) a second indication of a first difference in beam shape amplitude for each beam of a set of second beams associated with the beam zone and (iii) a third indication of a second difference in beam shape phase for each beam of the set of second beams associated with the beam zone; and
   derive at least one of an angle of arrival (AoA) or an angle of departure (AoD) of a channel based on the set of indications for each beam zone of the plurality of beam zones.

2. The apparatus of claim 1, wherein the set of indications, for each beam zone of the plurality of beam zones, further comprises a fourth indication of a beam width and a fifth indication of a boresight direction for each beam of the set of second beams associated with the beam zone.

3. The apparatus of claim 1, wherein the first indication of the full beam shape of the first beam comprises at least one of a fourth indication of a gain deviation tolerance level or a fifth indication of a phase deviation tolerance level.

4. The apparatus of claim 1, wherein the first indication of the full beam shape of the first beam comprises at least one of an amplitude or a phase for each azimuth and elevation in a grid for a main beam and a set of side beams associated with the full beam shape of the first beam.

5. The apparatus of claim 1, further comprising a transceiver coupled to the at least one processor, wherein, to receive the set of indications for each beam zone of the plurality of beam zones, the at least one processor is configured to:
   receive, via the transceiver, a radio resource control (RRC) configuration comprising the set of indications.

6. The apparatus of claim 1, wherein the full beam shape of the first beam associated with each beam zone of the plurality of beam zones is based on a function of frequency of the full beam shape.

7. The apparatus of claim 1, wherein the channel comprises at least one of a synchronization signal block (SSB) channel or a channel state information (CSI) reference signal (CSI-RS) channel.

8. The apparatus of claim 1, wherein the at least one processor is further configured to:
   select at least one beam based on at least one of the derived AoA or the derived AoD of the channel.

9. The apparatus of claim 8, wherein the at least one processor is further configured to:
   transmit at least one of a signal using the selected at least one beam or an indication of the selected at least one beam, wherein at least one of the signal or the indication is transmitted to a second wireless device.

10. The apparatus of claim 1, wherein the first beam comprises a prototypical beam and the set of second beams comprises a set of non-prototypical beams.

11. The apparatus of claim 1, wherein the first wireless device comprises a user equipment (UE), wherein, to receive the set of indications for each beam zone of the plurality of beam zones, the at least one processor is configured to:
   receive the set of indications from a network node.

12. The apparatus of claim 1, wherein the first wireless device comprises a network node, wherein, to receive the set of indications for each beam zone of the plurality of beam zones, the at least one processor is configured to:
   receive the set of indications from a user equipment (UE).

13. The apparatus of claim 12, wherein the channel comprises a sounding reference signal (SRS) channel.

14. The apparatus of claim 12, wherein the at least one processor is further configured to:
   perform sparse recovery of at least one of an uplink channel or a downlink channel associated with the UE based on at least one of the derived AoA or the derived AoD of the channel.

15. The apparatus of claim 1, wherein the first wireless device comprises a first user equipment (UE), wherein, to receive the set of indications for each beam zone of the plurality of beam zones, the at least one processor is configured to:
   receive the set of indications from a second UE.

16. The apparatus of claim 15, wherein the at least one processor is further configured to:

perform sparse recovery of a sidelink channel associated with the first UE and the second UE based on at least one of the derived AoA or the derived AoD of the channel.

17. An apparatus for wireless communication at a first wireless device, comprising:

a memory; and at least one processor coupled to the memory and, based at least in part on information stored in the memory, the at least one processor is configured to:

partition a panel of the first wireless device into a plurality of beam zones, wherein each beam zone of the plurality of beam zones is associated with a first beam and a set of second beams; and transmit a set of indications for each beam zone of the plurality of beam zones, wherein the set of indications, for each beam zone, comprises (i) a first indication of a full beam shape of the first beam associated with the beam zone, (ii) a second indication of a first difference in beam shape amplitude for each beam of the set of second beams associated with the beam zone, and (iii) a third indication of a second difference in beam shape phase for each beam of the set of second beams associated with the beam zone.

18. The apparatus of claim 17, wherein each of the set of second beams has an overlapping volume with the first beam that is greater than or equal to a threshold value.

19. The apparatus of claim 17, wherein each of the set of second beams has an overlapping area with the first beam that is greater than or equal to a threshold value.

20. The apparatus of claim 17, wherein the set of indications, for each beam zone of the plurality of beam zones, further comprises a fourth indication of a beam width and a fifth indication of a boresight direction for each beam of the set of second beams associated with the beam zone.

21. The apparatus of claim 17, wherein the first indication of the full beam shape of the first beam comprises at least one of a fourth indication of a gain deviation tolerance level or a fifth indication of a phase deviation tolerance level.

22. The apparatus of claim 17, wherein the first indication of the full beam shape of the first beam comprises at least one of an amplitude or a phase for each azimuth and elevation in a grid for a main beam and a set of side beams associated with the full beam shape of the first beam.

23. The apparatus of claim 17, further comprising a transceiver coupled to the at least one processor, wherein, to transmit the set of indications for each beam zone of the plurality of beam zones, the at least one processor is configured to:

transmit, via the transceiver, a radio resource control (RRC) configuration comprising the set of indications.

24. The apparatus of claim 17, wherein the full beam shape of the first beam associated with each beam zone of the plurality of beam zones comprises a function of frequency of the full beam shape.

25. The apparatus of claim 17, wherein the at least one processor is further configured to:

obtain at least one of a signal from a using a selected beam or an indication of the selected beam, wherein at least one of the signal or the indication is obtained from a second wireless device based on the set of indications for each beam zone of the plurality of beam zones.

26. The apparatus of claim 17, wherein the first beam comprises a prototypical beam and the set of second beams comprises a set of non-prototypical beams.

27. The apparatus of claim 17, wherein the first wireless device comprises a network node, wherein, to transmit the set of indications for each beam zone of the plurality of beam zones, the at least one processor is configured to:

transmit the set of indications to a user equipment (UE).

28. The apparatus of claim 17, wherein the first wireless device comprises a user equipment (UE), wherein, to transmit the set of indications for each beam zone of the plurality of beam zones, the at least one processor is configured to:

transmit the set of indications to a network node.

29. A method of wireless communication at a first wireless device, comprising:

receiving a set of indications for each beam zone of a plurality of beam zones, wherein the set of indications comprises, for each beam zone of the plurality of beam zones, (a) a first indication of a full beam shape of a prototypical beam associated with the beam zone, and (b) a second indication of a first difference in beam shape amplitude and a third indication of a second difference in beam shape phase for each beam of a set of non-prototypical beams associated with the beam zone; and deriving at least one of an angle of arrival (AoA) or an angle of departure (AoD) of a channel based on the set of indications.

30. A method of wireless communication at a first wireless device, comprising:

partitioning a panel of the first wireless device into a plurality of beam zones, wherein each beam zone is associated with a prototypical beam and a set of non-prototypical beams; and transmitting a set of indications for each beam zone of the plurality of beam zones, wherein the set of indications comprises, for each beam zone of the plurality of beam zones, (a) a first indication of a full beam shape of the prototypical beam associated with the beam zone, and (b) a second indication of a first difference in beam shape amplitude and a third indication of a second difference in beam shape phase for each beam of the set of non-prototypical beams associated with the beam zone.

* * * * *